Aug. 24, 1926.

A. M. YOCOM 1,597,498

BRAKE MECHANISM

Filed Oct. 27, 1923    2 Sheets-Sheet 1

Inventor
Alvin M. Yocom,
By Howard A. Coombs
Attorney

Aug. 24, 1926.  
A. M. YOCOM  
BRAKE MECHANISM  
Filed Oct. 27, 1923  
1,597,498  
2 Sheets-Sheet 2

Inventor  
Alvin M. Yocom,  
By Howard A. Coombs  
Attorney

Patented Aug. 24, 1926.

1,597,498

UNITED STATES PATENT OFFICE.

ALVIN M. YOCOM, OF POTTSTOWN, PENNSYLVANIA, ASSIGNOR TO U. S. AXLE COMPANY, OF POTTSTOWN, PENNSYLVANIA, A CORPORATION OF DELAWARE.

BRAKE MECHANISM.

Application filed October 27, 1923. Serial No. 671,076.

This invention relates to the brakes of motor vehicles, and consists in an improved mechanism for applying and equalizing the braking force in a pair of wheels, by simpler and more efficient means than heretofore devised. While the mechanism is especially adapted for front-wheel brakes, it may be employed on both the front and the rear brakes, in which case it provides a very simple hook-up, eliminating the need for any cross-shafts, other than that of the pedal, as well as for equalizing levers or the like.

In my application for Patent Serial No. 608,668, filed on Dec. 23, 1922, I have disclosed a novel form of front-wheel brake and means for actuating it, comprising oppositely slidable rods mounted on the axle each operatively connected to the brake of the adjacent wheel, the inner ends of said rods being connected by a pair of toggle-links, freely mounted on the axle and operated from the pedal, whereby the brakes in the two wheels on said axle are applied with equalized pressure. According to the present invention, I simplify and improve this operating means by the substitution of the means hereinafter described with reference to the accompanying drawing.

I have illustrated the present invention as operatively combined with the novel front or steering wheel brake of my said prior application, and will herein briefly describe said brake, although the mechanism which forms the subject-matter of this application may be used with other forms of brakes, as will be obvious.

In the drawing,

Figure 4 is a cross-section on line 4—4 of Figure 1.

Figure 1:
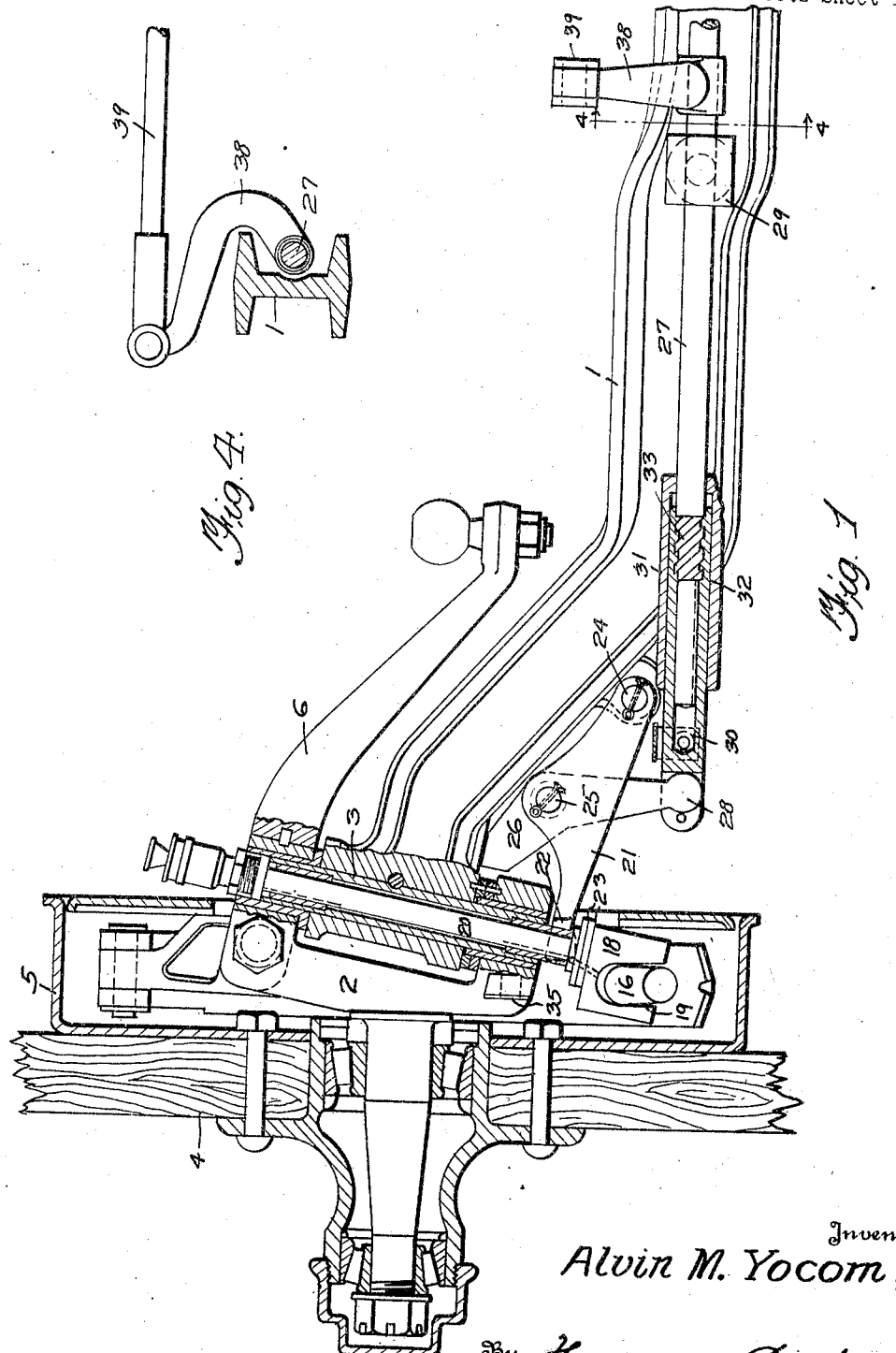
Figure 1 is a front view, partly in section, of an axle equipped with my steering-wheel brake mechanism.
Figure 2:
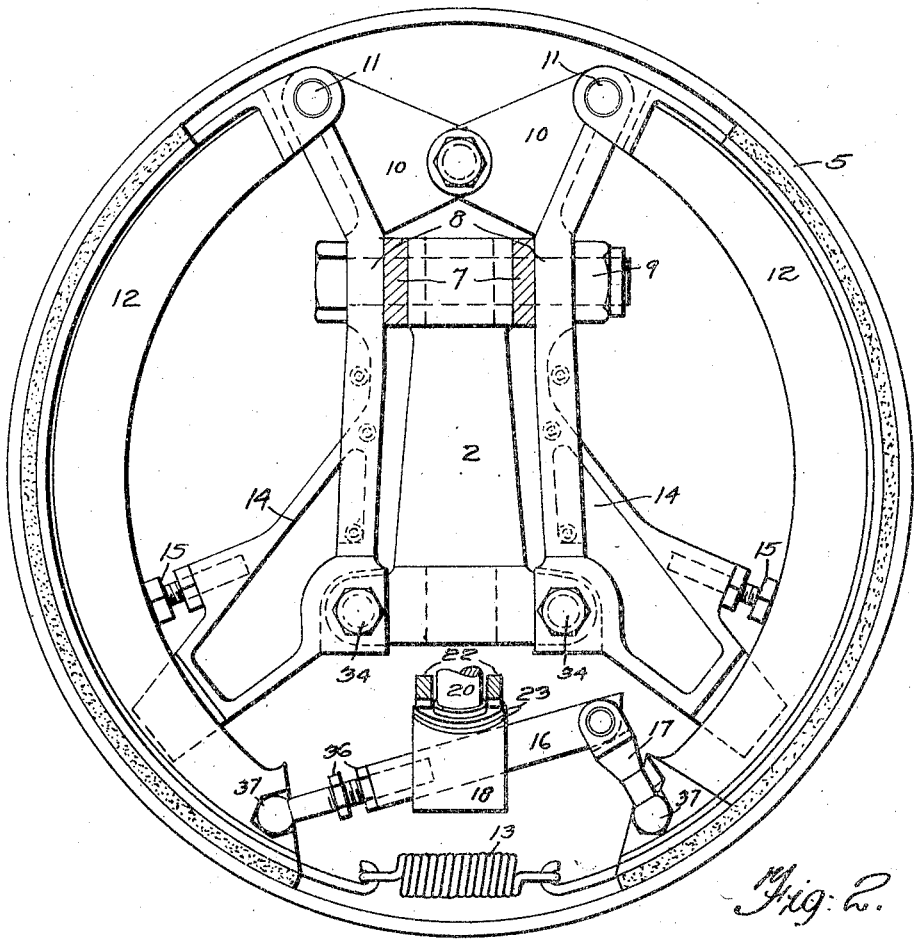
Figure 2 is an end view looking into the brake drum.

1 is the axle, 2 the knuckle, 3 the pivot or knuckle pin, 4 the wheel, 5 the brake drum and 6 the steering arm. This arm has a bifurcated end which fits on a squared portion of the knuckle; 7 in Figure 2 represents the ends of the bifurcated arms, and the anchor 8 fits on the outside of said arms, said three parts being rigidly secured together by the bolt 9. To ears 10 on the upper end of the anchor are pivoted, at 11, the brake-shoes 12, the lower free ends of which are tied together by the spring 13. 14 represents arms on the anchor which support the shoes against lateral movement, and 15 set-screws carried by said arms and serving as stops to limit the inward swing of the shoes. To increase the rigidity of these assembled parts, the anchor is also bolted, as at 34, to lugs 35 on the knuckle.

Figure 3:
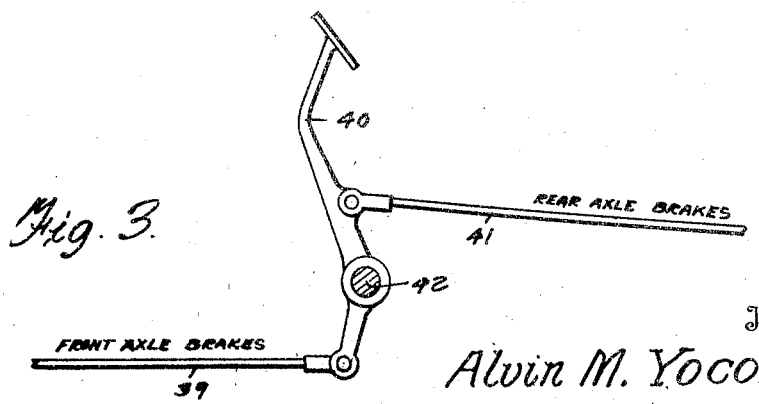
Figure 3 is a fragmentary side view of the foot pedal and connections for four wheel brakes.

16, 17, are the toggle-links which force the brake shoes apart into contact with the drum. One of these links, 16, is longer than the other, 17, and is adjustable in length, as shown at 36. The links engage the shoes by ball-and-socket joints 37, which permits of free oscillation of the toggle. The links are spread by a sliding yoke member 18, having its end slotted at 19 to straddle the link 16. The yoke member has a stem 20 which slides and rotates in the knuckle pin 3. The yoke member is depressed to actuate the toggle by a lever 21, pivoted at 24 on the axle and having bifurcated arms 22 which bear on a freely rotatable hardened ring or rings 23, interposed between the head of the yoke member and the ends of said arms. Pivotally carried at 25 by said lever 21 is a cam lever 26, the cam nose of which bears against the under side of the axle and the other end 28 of which is rounded and fits in a slot in the end of a sliding nut 30, reciprocable in a bearing 31 on the axle, and having a multiple, quick-pitch thread 32 in its other end. Engaging with this thread is a companion-screw 33, formed on the end of a rod 27, slidably and rotatably carried by the axle, as in bearing 29, and extending to the other side of the vehicle, where the mechanism just described is duplicated. At some convenient point on said rod 27 is fastened an arm 38, from which a pull-rod or cable 39 runs to the foot-pedal 40, shown in Fig. 3. The rear-wheel brakes are operated from said pedal by the connection 41, running from the other side of the pedal pivot 42 from the connection 39. It will be obvious that depression of the pedal will pull on both said connections and actuate the brake mechanism on both axles, thereby applying the brakes in all four wheels. As soon as the rod 27 is turned by a pull on the connection 39, the threads on its ends, which are of course of opposite pitch, push the nuts 30 outwardly, swing the cam-levers 26, the cam noses of which rock on the axle and consequently depress the levers 21 and spread the toggle to set the brakes. It will be seen that the rod 27 acts as an equalizer, as well as an actuator, because if the nut 30 on one side encounters more resistance than the nut 30 on the other side, said rod 27 slides in its bearing 29 on the axle until the resistance at both ends is equalized.

It will be understood from what has been said that both pairs of wheels may contain the brake described, but naturally any other form of brake may be used in the rear wheels, the essential features of the present invention being the equalizing brake-actuating mechanism mounted on the axle, as described.

The construction and advantages of this invention will now be apparent, it is believed, and what I believe to be patentably novel is set forth in the following claim.

What I claim is:

Brake mechanism for the steering-wheels of motor vehicles, comprising a rod rotatably and slidably mounted on the fixed axle and oppositely screw-threaded at its ends, a lever centrally secured to said rod by which it may be rotated while free to slide, nuts slidably mounted at each end of the axle and engaged by the screw-threaded ends of said rod, a cam-lever arranged to engage with one end the adjacent nut and bearing on the under-side of the axle with its other end, a lever pivoted to each end of the axle and to the adjacent cam-lever, and a brake applying yoke member in each wheel operatively connected with the free end of the adjacent last mentioned lever.

In testimony whereof I have hereunto set my hand.

ALVIN M. YOCOM.